(12) United States Patent
Hassett

(10) Patent No.: US 6,960,234 B2
(45) Date of Patent: Nov. 1, 2005

(54) MULTI-FACETED GASIFIER AND RELATED METHODS

(75) Inventor: Scott E. Hassett, Murray, UT (US)

(73) Assignee: Emery Energy Company, L.L.C., Salt Lake City, UT (US)

(*) Notice: Subject to any disclaimer, the term of this patent is extended or adjusted under 35 U.S.C. 154(b) by 676 days.

(21) Appl. No.: 10/005,279

(22) Filed: Dec. 4, 2001

(65) Prior Publication Data

US 2002/0095866 A1 Jul. 25, 2002

Related U.S. Application Data

(60) Provisional application No. 60/251,076, filed on Dec. 4, 2000.

(51) Int. Cl.$^7$ .................................................. C10J 3/16
(52) U.S. Cl. ...................... 48/77; 48/210; 48/199 FM; 48/61; 48/76; 48/202; 48/203; 48/DIG. 3; 423/414; 95/90; 422/150; 422/188; 422/193; 422/211
(58) Field of Search ............................. 48/61, 62 R, 71, 48/73, 77, 78, 85.2, 89, 76, 98–101, 111, 119, 128, 197 R, 200–202, 204, 203, 209, 210, DIG. 3; 422/139, 144, 147, 150, 152, 156, 168, 169, 177, 188, 189, 193, 194, 198, 211, 224, 232, 236; 252/373; 423/414; 95/90

(56) References Cited

U.S. PATENT DOCUMENTS

| | | | |
|---|---|---|---|
| 4,022,591 A | 5/1977 | Staudinger | 48/76 |
| 4,069,024 A | 1/1978 | Fernandes | 48/197 |
| 4,199,327 A | * 4/1980 | Hempill et al. | 48/202 |
| 4,436,531 A | 3/1984 | Estabrook et al. | 48/197 |
| 4,547,203 A | 10/1985 | Jahnke | 48/197 R |
| 4,872,886 A | 10/1989 | Henley et al. | 48/197 |
| 4,883,499 A | 11/1989 | Beierle et al. | 48/203 |
| 4,967,673 A | 11/1990 | Gunn | 110/346 |
| 5,505,766 A | 4/1996 | Chang | 95/134 |

OTHER PUBLICATIONS

Generator Gas: The Swedish Experience from 1939–1945, SERI/TP–49–183, edited by T.B. Reed (Solar Energy Research Instistute, Golden, Republished with index by TIPI Workshop, Allenspark, Colorado, No. 1982, pp. 40–44.

Coal Gasification Processes, Noyes Data Corporation, 1981, pp. 45–75.

Coal Gasification Processes, Noyes Data Corporation, 1981, pp. 77–109.

Coal Gasification Processes, Noyes Data Corporation, 1981, pp. 213–265.

Coal Gasification Processes, Noyes Data Corporation, 1981, pp. 290–373.

Advanced Coal Gasification Technical Analyses, Appendix 1, Technology Reviews, Dec. 1982–Sep. 1985, National Technical Information Service.

* cited by examiner

*Primary Examiner*—Samuel M. Heinrich
(74) *Attorney, Agent, or Firm*—Madson & Metcalf

(57) ABSTRACT

A gasifier is disclosed combining a fixed bed gasification section where coarse fuel is gasified and an entrained flow gasification section where fine fuel is gasified. The fixed bed section includes upper and lower sections. Coarse fuel is devolatilized in the upper fixed bed section and subjected to elevated temperatures sufficient to crack and destroy tars and oils in the effluent gases. The entrained flow gasification section is disposed in a lower plenum adjacent the lower fixed bed section. A plurality of injection ports are configured to introduce oxygen, steam, or air into different sections of the gasifier to control temperature and operating conditions. Activated carbon may be formed in the upper fixed bed section and in the entrained flow section. The activated carbon may be used as a sorbent to remove pollutants from the effluent gases. The gasifier may be used with various coarse and fine fuel feedstocks.

100 Claims, 9 Drawing Sheets

MULTI-FACETED GASIFIER AND RELATED METHODS

CROSS-REFERENCE TO RELATED APPLICATION

This application claims the benefits of U.S. Provisional Application No. 60/251,076, filed Dec. 4, 2000.

FIELD OF THE INVENTION

The present invention relates generally to gasification of carbon-containing fuels and more particularly to novel gasification apparatus and methodology for the gasification of carbonaceous feedstocks that incorporates both fixed-bed gasification processes and entrained-flow gasification processes in one vessel. Optionally, fluidizing principles may be utilized in the gasifier. Internally generated activated carbon char may be used as the principal sorbent for synthesis gas cleaning to produce an environmentally superior synthesis gas (syngas). The present invention is able to receive and process coarse fuels in the fixed bed sections and pulverized or fine solids, as well as liquid and gaseous feedstocks in the entrained flow section.

BACKGROUND OF THE INVENTION

Broadly, gasification is the creation of combustible gas known as synthesis gas and commonly referred to as "syngas" herein, from carbon-containing fuels. Gasification is a well-known industrial process used for converting solid, liquid and gaseous feedstocks using reactants such as air, oxygen, and steam into gases such as hydrogen, carbon monoxide, carbon dioxide, and methane. The resulting gases can be used for generating electrical power, producing heat and steam, or as a feedstock for the production of various chemicals and liquid fuels, or any combination of the above. To appreciate the present invention, it will be helpful to have an understanding of the history of gasification and current limitations of prior art in commercial gasification technologies.

Various forms of gasification have been used since the 1800's as a way to convert solid fuels (primarily coal) to gaseous fuel (synthesis gas or syngas). Large-scale coal gasification was first applied as a way to generate town-gas, distributed through pipeline systems throughout much of Europe prior to the development and use of natural gas.

The oldest gasification processes is known as fixed bed (or moving bed) gasification. The Germans originally developed fixed bed gasification and subsequently the first large-scale fixed bed coal gasifiers. Additional processes including fluidized bed gasification and entrained bed or entrained flow gasification processes have been developed more recently by others. All three gasification processes have both beneficial as well as limiting features, which the following discussion will generally describe.

Fixed-bed gasification requires coarse fuels (typically ¼" to 2" in diameter). The most well known and widely used fixed-bed gasification technology is the Lurgi Dry Ash gasifier (the ash is recovered dry and does not turn molten or slag). The Lurgi Dry Ash technology is presently used by the country of South Africa, to convert large reserves of coal into syngas, which is then converted to liquid fuels and chemicals via downstream syngas catalysts. Nearly half of all transportation fuels used in South Africa come from the Lurgi-based coal gasification plants in that country. Presently, there is one Lurgi-based gasification installation in the United States that converts lignite (high moisture, low rank) coals to syngas, which is then subsequently converted to pipeline quality methane and sold into the natural gas pipeline system. An advantage of the Lurgi gasifier is its ability to produce a syngas with a ratio of hydrogen to carbon monoxide greater than two. This allows the syngas, after cleaning, to be used in downstream conversion processes to make liquid fuels and chemicals that require this higher ratio.

Fixed-bed gasification uses coarse fuels, which first must be devolatilized (i.e. drive off all volatile compounds) before gasification of the remaining fixed carbon occurs. The carry over in the syngas of tars and oils from the Lurgi Dry Ash gasifier led to the development of the British Gas Lurgi (BG/L) fixed-bed slagging gasifier. While it too carries over tars and oils with the initial raw syngas effluent, the BG/L has the ability to re-circulate and re-inject the tars and oils into the hotter lower slagging (molten ash) section of the gasifier, where the tars and oils are converted into syngas constituents. The reinjection of tars and oils is an unnecessary additional step that is eliminated by the present invention. It would be an advancement in the art of fixed-bed gasifiers to provide a gasification system that prevents the creation of tars and oils in the raw syngas effluent.

Limiting technical features of fixed-bed gasification include: (1) tar and oil carry over with the syngas; (2) difficulty in using coal/fuel fines because they clog the void space between the coarse fuels in the fixed bed (because of this, large piles of discarded coal fines are stockpiled adjacent to these plants or transported off-site to combustion facilities that can use the fines, resulting in low overall coal-to-product efficiencies); (3) difficulty in using liquid hydrocarbon feedstocks; and (4) difficulty in using caking coals (coals with low ash fusion temperatures) which often require mechanical stirring to agitate the fuel bed.

A newer gasification process is known as entrained-flow or entrained-bed gasification. Pulverized solid fuels and/or viscous liquid fuels are fed to the gasification reactor and are rapidly converted to syngas. One major advantage of the entrained-flow gasification processes is that no oils and tars are produced, precluding their presence in the effluent syngas.

Another advantage of the entrained-flow gasification process is its ability to gasify liquid feedstocks (i.e. oil or heavy oil residuals from refineries). The primary entrained-flow gasification technologies include those developed by: Texaco, Shell and Dow Chemical (Destec). Entrained-flow gasification processes are unable to easily process coarse fuels. This makes it difficult to process certain fuels, such as biomass and segregated municipal solid waste or scrap tires (fuels that cannot be economically pulverized for use as fuel). Another limitation of entrained-flow gasification is the inability to achieve wide internal control of the hydrogen to carbon monoxide ratio in the exiting syngas. To adjust this ratio in favor of hydrogen would require an additional downstream water gas shift reactor to increase hydrogen and reduce carbon monoxide.

Entrained-flow gasification technologies also have technical and fuel processing limitations. In order to convey the fuel into the gasifier, some entrained flow gasifiers use a slurry feed that is often water mixed with pulverized solids at approximately a 1:2 ratio respectively. Other commercial entrained flow gasifier use dry feeds pulverized solid into the gasifier. All these gasifiers produce a syngas with a hydrogen to carbon monoxide ratio of approximately 1:1 or less with limited ability to control this ratio. Gasifiers using the slurry feed process for solids feedstocks limit their ability to use high moisture fuels such as lignite coals as too much moisture fed to the gasifier system results in poor gasification performance.

In addition to the limitations cited above, other prior art problems include: (a) clogging, caking and/or undesired accumulations of material in the fuel delivery, bed and/or slag discharge regions of the gasifier; (b) inadequate sulfur and pollutant species control requiring the need for extensive syngas cleaning and processing equipment downstream of the gasifier; (c) high installation and operational costs; and (d) limited fuel flexibility.

A third gasification process known as the fluidized bed process has been utilized on a limited basis. Fluidized bed gasifiers also use coarse fuels, however the coarse fuels are somewhat smaller in size than coarse fuels used by fixed bed gasifiers. An advantage of the fluidized bed processes is its ability to use fuels with relatively high ash contents. Fluidized bed gasification processes face challenges related to fuel agglomeration in the bed. In addition, fluidized bed gasification processes realize some similar limitations as fixed bed processes.

To summarize, the principle limitations of prior gasification art include the limited ability to simultaneously process or gasify both coarse and fine solid fuels or simultaneously process or gasify both coarse and liquid hydrocarbon feedstocks resulting in a general lack of fuel flexibility in any one system. While gasification plants are generally able to meet exceedingly high emission limitations, their capital costs remain high. Costs in controlling pollutant species must be reduced to allow its widespread use for many energy or electricity generating plants. The present invention is designed to overcome these challenges.

BRIEF SUMMARY OF THE INVENTION

The present invention is drawn to a continuous gasification process for producing environmentally superior synthesis gas by having internal capabilities of generating activated carbon char as a medium to adsorb well-known pollutants found in synthesis gas streams. Furthermore, this process is capable of using a wide array of carbonaceous fuel types by having both fixed bed and entrained flow gasification processes in a single vessel. Furthermore the present invention is also able to utilize fluidizing features to agitate the fixed bed fuel and/or the ash to optionally increase the carry-over of activated carbon char particulates with the effluent syngas stream. The present invention is preferred to operate as a slagging gasifier.

The present invention prefers to use a dry feeder burner for the entrained flow feed inlet sections preventing the need for a water slurried feeding process. Due to the ability to dry feed the fuels into the entrained flow section coupled with a fixed bed of fuel, the present invention is able to advantageously control the steam to oxygen ratio, which results in the ability to increase hydrogen production from a partial water gas shift reaction inside the gasifier. If desired, further internal temperature moderation using steam can encourage subsequent methanation reactions to increase the methane content of the syngas. Having control over the hydrogen to carbon monoxide ratio eliminates or mitigates the need to have additional water gas shift reactors and/or secondary gasifiers downstream of the main gasifier. This can improve overall plant economics when producing products that require a higher ratio, such as methanol, ammonia, methane or liquid fuels via various catalysts and downstream processes that utilize synthesis gas.

The coarse fuel is fed to the top of the gasifier where the fuel bed elevation is self-regulating by three step changes in bed diameter. The first step change is close to the top of the gasifier where coarse fuel enters and slopes to the fuels' angle of repose. This upper section represents the downdraft gasification section of the fixed bed section of the gasifier, hereinafter referred to as the hood. In the hood, coarse fuels devolatilize before being converted to activated carbon char near the bottom of the hood, where temperatures are raised to just below the ash fusion point of the coarse fuel. Injecting additional air or oxygen and steam may sufficiently eliminate tars and oils. The inclusion of the hood apparatus within the main gasifier vessel forms an upper plenum around the outside of the hood where the synthesis gas has an exit port. All upper fixed bed gasification gases must pass, in downdraft fashion, or concurrently with the fuel, around the lower lip of the hood before entering the upper plenum and exiting the gasifier at the exit port.

The hood may be a steel cylindrical insert with supporting lower inwardly converging edges that hold the ceramic material used in lining its interior. To ensure proper cooling and temperature control of the steel on the hood, bayonet tubes may be used on its exterior with circulating water.

After the fixed carbon char passes below the bottom lip of the hood, the coarse fuel then again flows outward forming another angle of repose toward the interior wall of the ceramic lined main gasifier shell.

Another internal step change begins in the same area forcing the coarse fuel to converge as it moves downward toward the lower fixed bed section of the gasifier. The purpose of the ceramic lining to downwardly converge in diameter is to create a lower annular plenum surrounding the lower fixed bed fuel, for which to receive the gases from the entrained flow gasification section using tangentially fired burners. As the coarse fixed carbon char moves downward below the hood, gases flow in an updraft fashion counter-current with the fuel. The fuel continues to move downward toward the ash slagging region where the molten ash is removed through a slag tap at the bottom. Wherever the coarse fuel touches the ceramic lined portion of the gasifier, a plurality of orifices may be used to fluidize or agitate the coarse fuel or ash.

The entrained flow gasification section can feed fine or pulverized solids, liquid or gaseous fuels, or any combination thereof. The entrained flow section may process approximately twice the fuel that is fed to the fixed bed section. Gases from the entrained flow section work their way upward through the lower fixed bed mixing first with the gases derived from the lower fixed bed, then continuing to move upward ultimately mixing with the gases exiting from the hood section. All gases blend in the upper plenum before exiting the gasifier. The upper plenum also acts as the means to control the residence time and temperature of the gases before exiting to ensure destruction of tars and oils.

In addition, the gasifier can extract activated carbon char from the gasifier in two ways. One is to intentionally carry over carbon particulate with the syngas effluent which is then separated by a particulate removal system. The second is to have an extraction port in which coarse fuels from the mid section of the gasifier are extracted. The latter method is only used if the volume of material carried out as particulate cannot supply enough activated carbon char to the downstream baghouse system to meet desired pollution adsorption rates and efficiencies.

In summary, the present invention overcomes or substantially alleviates many problems heretofore existing in the gasification art. The present invention comprises both novel apparatus and unique methodology for the gasification of carbonaceous feedstocks to produce an environmentally superior synthesis gas (syngas) combining fixed-bed gasification processes and entrained-flow gasification processes into one vessel. Optionally, fluidizing principles may be utilized to pulsate the coarse fuels and/or ash in the bed. In addition, the gasifier's fixed-bed component combines both downdraft gasification and updraft gasification. Superior operating characteristics within the gasifier are achieved increasing chemical and thermal efficiencies while lowering costs for syngas production. The gasification process represented in the present invention is highly fuel-flexible and able to utilize both coarse and pulverized solid fuels, as well as liquid or gaseous feedstocks or any combination thereof. The hydrogen-to-carbon monoxide ratio in the syngas is readily controlled from a range of 0.5:1 to 3.3:1. Internally generated activated carbon char creates an adsorbent medium for removing pollutants from the syngas including, but not limited to, sulfur species, mercury, chlorides and others. Clogging and caking are minimized, tars and oils are eliminated within the gasifier and are not carried out with the raw syngas, and high process efficiencies are obtained resulting in lower costs for equipment, installation and operating costs. These and other objects and features of the present invention will be apparent from the detailed description taken with reference to the accompanying drawings.

BRIEF DESCRIPTION OF THE DRAWINGS

FIGS. 4 and 4A are cross-sectional drawings that represent the internal hood in the upper fixed-bed section of the gasifier.

DETAILED DESCRIPTION OF THE INVENTION

Figure 1:
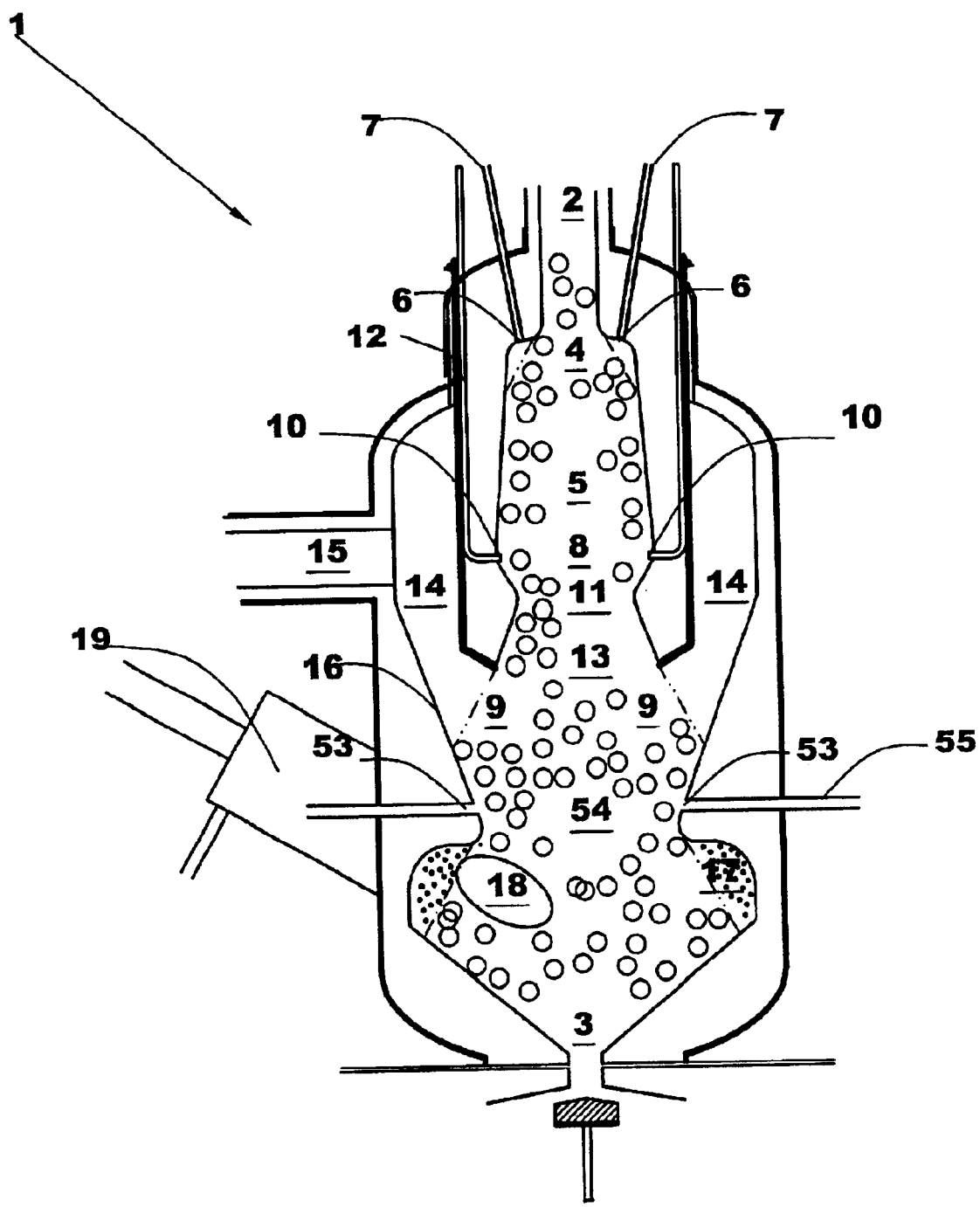
FIG. 1 is a cross-sectional representation of a gasifier within the scope of the present invention.

Reference will now be made to currently preferred embodiments of the invention, which are illustrated with figures. In the illustrated embodiment, shown in FIG. 1 a cross sectional view of the gasifier 1, is shown. Coarse sized carbonaceous feedstock enters at the top of the gasifier, through a coarse feed inlet 2 and proceeds downward moving through gasifier 1 until it becomes a molten ash at the bottom 3. Coarse feedstocks can include, but are not limited to, the following: coal, petroleum coke, municipal solid waste, biomass, or any combination thereof. Below the course feedstock inlet 2 the fuel enters a pyrolysis zone, labeled 4 at the top of the zone and 5 at the bottom of the zone. In the pyrolysis zone the coarse fuel is heated by a combination of combustion and gasification, which causes the coarse fuel to devolatilize. The combustion oxygen or air and steam needed for pyrolysis enter through several ports 6 by passing through pipes 7. The amount of oxygen or air added at port 6, is set to keep the temperatures at point 4 between 500° F. and 1500° F. and preferably above 700° F. and at point 5 between 800° F. and 1500° F., and preferably approximately 1200° F. At points around the ports 6 a hot combustion flame may occur as the oxygen or air burns with the pyrolysis gases coming off the fuel. As the gases spread throughout the pyrolysis zone 4 to 5 the gas temperatures moderate.

Like other downdraft fixed-bed gasification processes, both the fuel and pyrolysis gases move downward. This downward gas movement causes the pyrolysis gases to pass through an oxidation gasification zone between points 8 and 9. At inlet ports 10, more oxygen or air and steam enter the gasifier to raise the temperature of the gases to a temperature a margin below the ash softening point of the fuel at the throat 11. Several pipes 12 may carry the oxygen or air and steam to the ports 10. For typical coals, the ash softening point ranges from 1900° F. to about 2400° F. During operation the maximum peak temperature in the throat 11 zone is maintained at least 50° F. below the ash softening point, with 100° F. below as the normal maximum condition.

As the pyrolysis gases pass through the combustion zone at throat 11 and out to the exit of the bed at point 9, most if not all the tars and oils are destroyed and converted to syngas. The main chemical constituents of syngas are hydrogen, carbon monoxide, methane and carbon dioxide. The section of the gasifier from the fuel entry 2 to the designated point 13 is called the hood section or the upper fixed bed section. The gases from the hood section leave the coarse fuel bed at point 9.

On leaving the bed the gases pass up the annular plenum 14. The volume of the plenum 14 is sized to provide sufficient residence time of the gases to destroy and convert any remaining tars and oil to syngas before they pass out of the gasifier through exit pipe 15. A typical residence time will be at least two seconds for applications where the slightest levels of tars or oils are not permissible. Furthermore, the steam to oxygen or air ratios and flows are adjusted to keep the temperature at bed exit 9 in the range from 1000° F. to 1600° F. and preferably at about 1550° F. when operating for a near zero tar and oil carry over from gasifier. This combination of high temperature and residence time for two or more seconds has been shown in test programs to completely destroy all tars and oils.

One important feature of the hood section is the ability to control the amount of oxygen or air and steam introduced at ports 6 and ports 10. This allows the temperature of the coarse fuel to be raised sufficiently high to ensure complete devolatilization of the fuel and destruction of all tars and oils before they exit the hood section at location 13. The hood section between points 2 and 13 represents the first stage of a two-stage, fixed bed within the gasifier. As the coarse fuel reaches the bottom of the hood section substantially all of the volatiles have been driven off and the tars and oils have been consumed due to the high temperatures near the end of the hood at points 8, 11, and 13.

After the fuel has been devolatilized, the remaining fixed-carbon has become activated carbon char and ash solids, which continue to move downward toward the lower part of the bed. The primary internal gasifier wall 16 may converge to create a second lower plenum 17. This lower plenum 17 is the zone for which the entrained flow fine or particulate fuel enters from a combustion gasification cylindrical chamber 18. Fine, liquid and/or gaseous fuels may be fed to this lower section using one or more tangentially fired burners 19. The gasification of fine, liquid and/or gaseous feedstocks occurs almost instantaneously within the tangential burners 19 and within the lower plenum 17 around the lower coarse fuel bed. Feedstocks for the entrained flow section may include, but are not limited to: pulverized coal, pulverized petroleum coke, liquid hydrocarbons, natural gas, other fine fuels, or any combination thereof. Gases from the entrained-flow section move upward through the lower fixed bed traveling from point 17 to point 9. Gases from the lower fixed bed and the upper fixed bed mix in the upper plenum 14 with gases derived from the entrained flow section before exiting the gasifier at the gasifier exit 15.

Thus, coarse fuels are fed in the top of the gasifier forming the fixed-bed gasification zone, while fine, liquid and/or gaseous fuels are fed into the lower entrained-flow section of the gasifier. The integration of these two types of gasification processes allows for the entrained-flow section to receive dry fed fine or pulverized fuels that are not transported by water slurry. By doing so, the gasifier is able to have wide control over the steam to oxygen ratio within the gasifier, which in turn gives the gasifier the ability to advantageously control the hydrogen-to-carbon monoxide ratio in the syngas effluent gas.

In addition, the two-stage fixed bed section of the gasifier consumes essentially all tars and oils while converting some of the fixed-carbon to activated carbon within the gasifier. Some of this activated carbon may be used in the cleanup system as a multi-pollutant absorbent for undesirable gaseous species.

Figure 2:
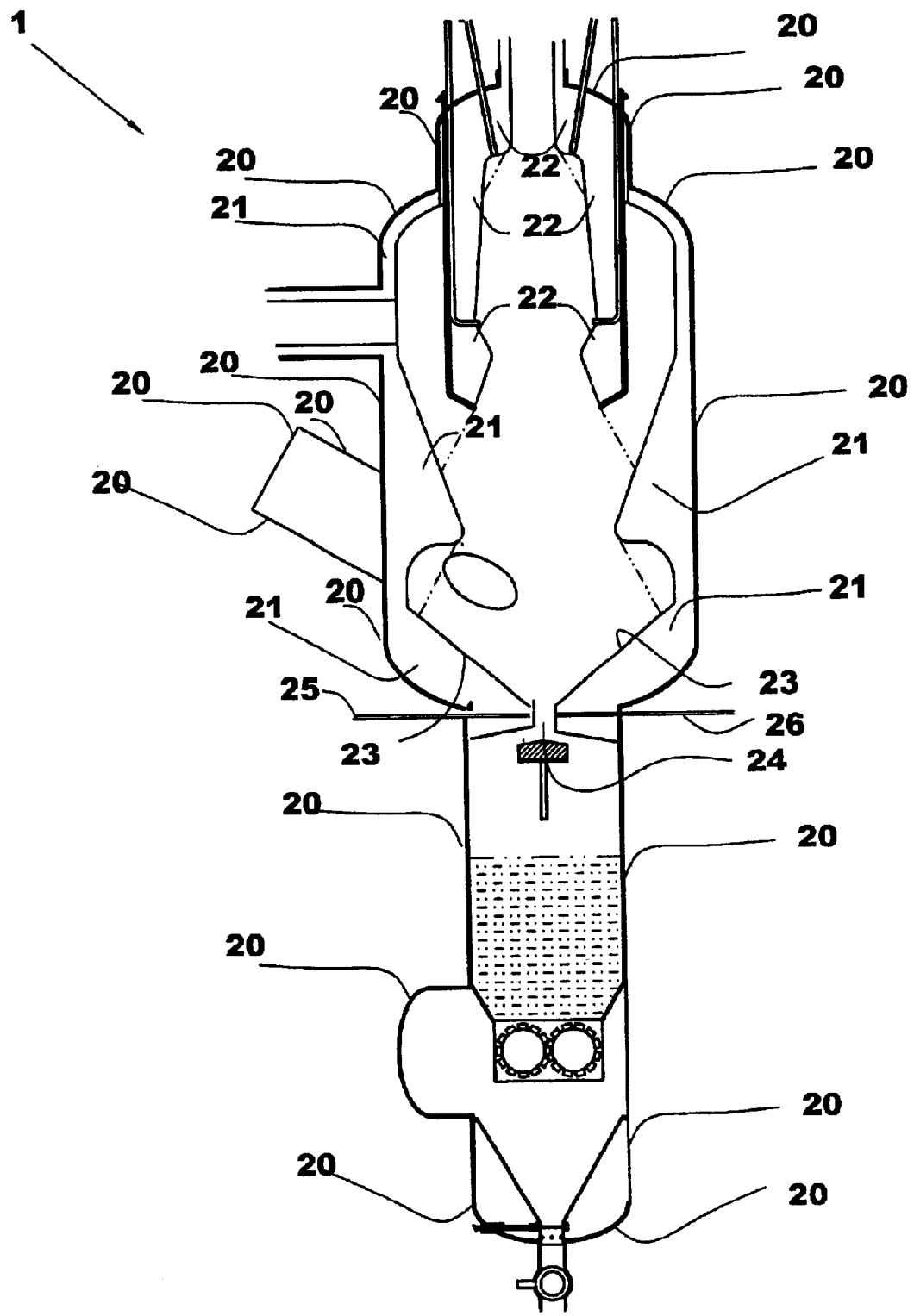
FIG. 2 is also a cross-sectional representation of the gasifier with additional numbers.

Gasifier 1 shown in FIGS. 1 and 2 comprises an ASME coded pressure vessel, generally designated 20 in FIG. 2. The pressure vessel 20 is a complex geometry to provide for all the functions. The outside of vessel 20 is kept at coded acceptable temperatures by providing cooling. The two normal methods are air-cooling and water-cooling. Air-cooling using wall radiation to the environment is simplest and least expensive cooling method. The inside of the vessel preferably includes a ceramic liner 21 for the main vessel and a ceramic liner 22 for the hood section of the vessel. The ceramic covers all areas were excessive temperatures exist. With properly designed ceramic liners 21 and 22, radiant cooling to the environment is acceptable. Force draft cooling using air is the next simplest and most economic cooling method. To do this, a shroud is built around the vessel and air is forced through the shroud. For applications where a slight efficiency improvement is desirable, and representing the third method of cooling, the vessel can be water jacketed to make steam for use in the gasifier or in the rest of plant.

Figure 3:
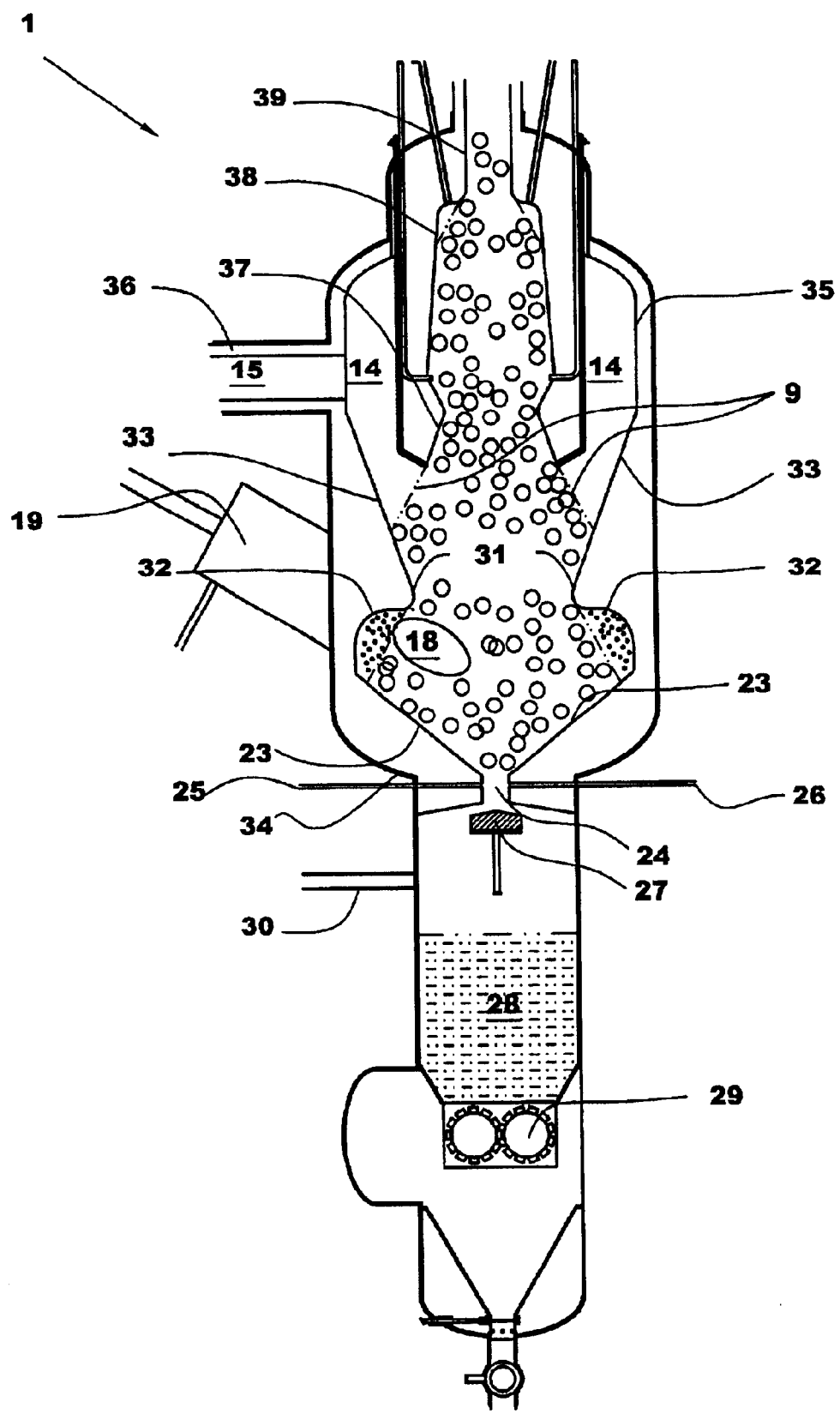
FIG. 3 is also a cross-sectional representation of the gasifier with additional numbers.

On the inside of the gasifier 1 the internal shape of the ceramic liners 21 and 22 are important to the success of the gasifier. In FIG. 3 the internal cross section of the ceramic bottom surface 23 is shown. Surface 23 provides a cone shaped slope for molten ash to run toward the molten ash extraction hole 24. An oxygen port 25 and gaseous fuel port 26 (more than one each can be used) are provided to create a hot flame to keep the ash in a molten state in the extraction hole 24 by firing as needed. The gaseous fuels can be any of several including recycled syngas, propane, or natural gas. In some applications even oil can be used. When the molten ash passes through the hole 24 it slides over a ceramic disk shaped plate 27. Plate 27 is sloped to cause the molten ash to side off the plate 27. As the drops from the plate 27 it falls into a water bath 28 where the molten ash solidifies. As the solidified ash drops through the water bath 28 it has to pass through a clinker grinder 29 which crushes the ash to a size that it can be hydraulically conveyed to a ash storage tank. Persons skilled in the art will appreciate that a wide variety of alternative ash collection and handling systems may be used herein.

A steam vent 30 on the side of the vessel removes the steam formed by the ash and prevents the steam from excessive streaming through the molten ash extraction hole 24 which could lead to ash solidification in the hole 24. The steam coming from vent 30 is used to provide part of the gasifier's steam requirements. The spacing between ceramic plate 27 and the bottom of hole 24 is adjustable. Collection of molten ash into dry, non-water bath containers can also be used, but it is not discussed herein.

Above the cone shape ceramic section 23 the ceramic liner 21 may be shaped to form a restriction zone 31. This creates a cavity below the ceramic liner at point 32 forming a lower annular plenum around the lower fixed bed of coarse fuel. The gases from the tangentially fired burners 19 enter the angular pocket at opening 18. The gases circle around the lower plenum 32, and enter the bed of fuel.

Above restriction 31 the ceramic surface 33 is also preferably cone shaped. The coarse fuel bed from the hood bottom opening 13 is a smaller area than the ceramic surface 31 below it. This causes a natural bed free surface between ceramic surface 33 and hood exit area 13. The free surface at point 9 is where all the gases leave the bed from both the hood section and the lower fixed bed section. They pass through upper plenum zone 14 before exiting the gasifier at the exit pipe 15.

The ceramic used at surfaces 33, 32, 31 and 23 and in the hood is preferably a high temperature, high quality ceramic, like Zirchrom 90 produced by Saint-Gobain Industrial Ceramics. Zirchrom 90 has an operating temperature over 2800° F. and is composed of 86% $Cr_2O_3$ and 7% $ZrO_2$. The ceramic is made of sized blocks for assembly in the vessel. The ceramic liner is supported by vessel wall 20 and the vessel domed bottom 34. Cheaper less heat resistant ceramic is preferably used as liner material between the vessel 20 and the high temperature ceramics that form the inside surfaces. For the ceramic surfaces 35 and 36 a less expensive ceramic may be used like AL100 which is $Al_2O_3$. In the hood section a high quality ceramic like Zirchrom 90 may be used in the high temperature surface zones, designated points 37 and 38, and a ceramic like AL100 in the low temperature ceramic surface 39.

Figure 4:
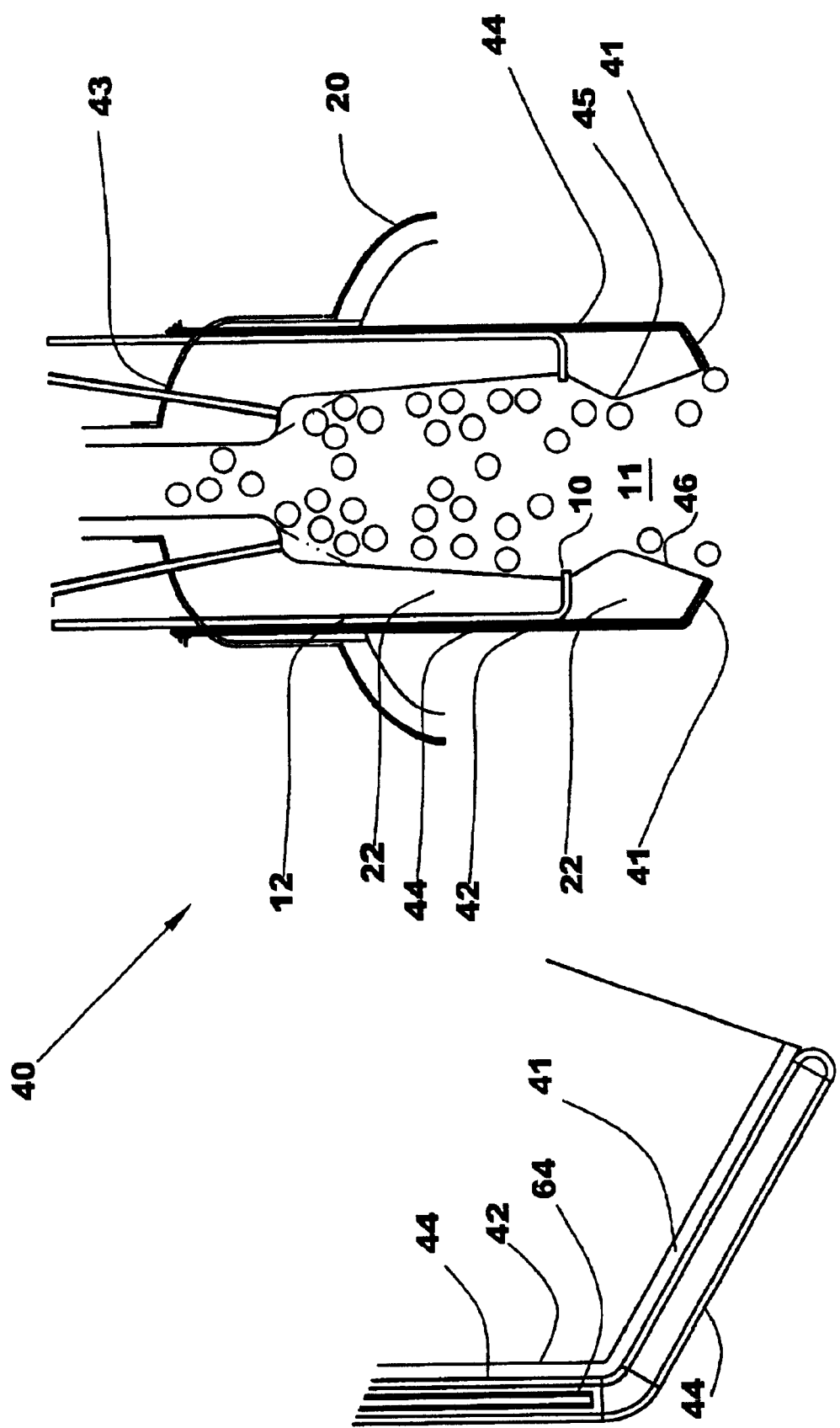

FIG. 4 shows the hood section 40 of gasifier 1. A cone-shaped steel section 41, supports the ceramic liner 22. This is shown better in FIG. 4A, which is an enlargement of the bottom left corner of the hood 40. The cone section 41 forms the bottom of the hood 40 and is preferably welded to a vertical steel cylinder 42. The cylinder 42 is preferably welded to hood vessel top 43. A number of vertical axis bayonet tubes 44 may be welded around the circumference of cylinder 42. The bayonet tubes penetrate through the domed vessel top 43. A small diameter tube 64 is preferably in the center of each bayonet tube to allow boiler water to pass down the tube. The bayonet outer tube 44 may be bent at the bottom and welded to the cone section 41. The inner tube 64 stops at the bend point. Normally water entering the inner tube 64 of the bayonet tubes is close to the water boiling point for the water pressure used. As the water passes up the outer bayonet tube 44 the heat transfer causes the water to boil and form a two-phase mixture of water and steam. These bayonet tubes 44 cool the steel cone 41 and steel cylinder 42, keeping them within their ASME coded material strengths. The steam may be used for the gasifier's steam inlet needs or in other uses of the plant.

The oxygen or air mixed with steam in pipes 12 may be attached to the steel cylinder 42. There may be many pipes 12 around the annulus of cylinder 42 that provide inlet gases to hood 40.

The ceramic surface 45 forms the throat of the gasifier. The throat is a restriction in flow area for the gases formed, which causes the temperature to increase in the throat zone 11. This area restriction and increased operating temperature is designed to prevent oils and tars formed in the devolitilization of coarse fuel from escaping the hood 40. Effluent gases passing through the throat 11 are exposed to temperatures high enough, in combination with the gasification and combustion reactions, to crack and convert oils and tars to the primary syngas compounds, mainly hydrogen, carbon monoxide, methane and carbon dioxide. The ceramic surface 46 is an inverted cone shape surface that is steep enough to keep the bed material against it and allow the gases to expand and limit the associated pressure drop. The region between inlet ports 10 to the throat 45 is the primary combustion zone of the hood section.

Figure 5:
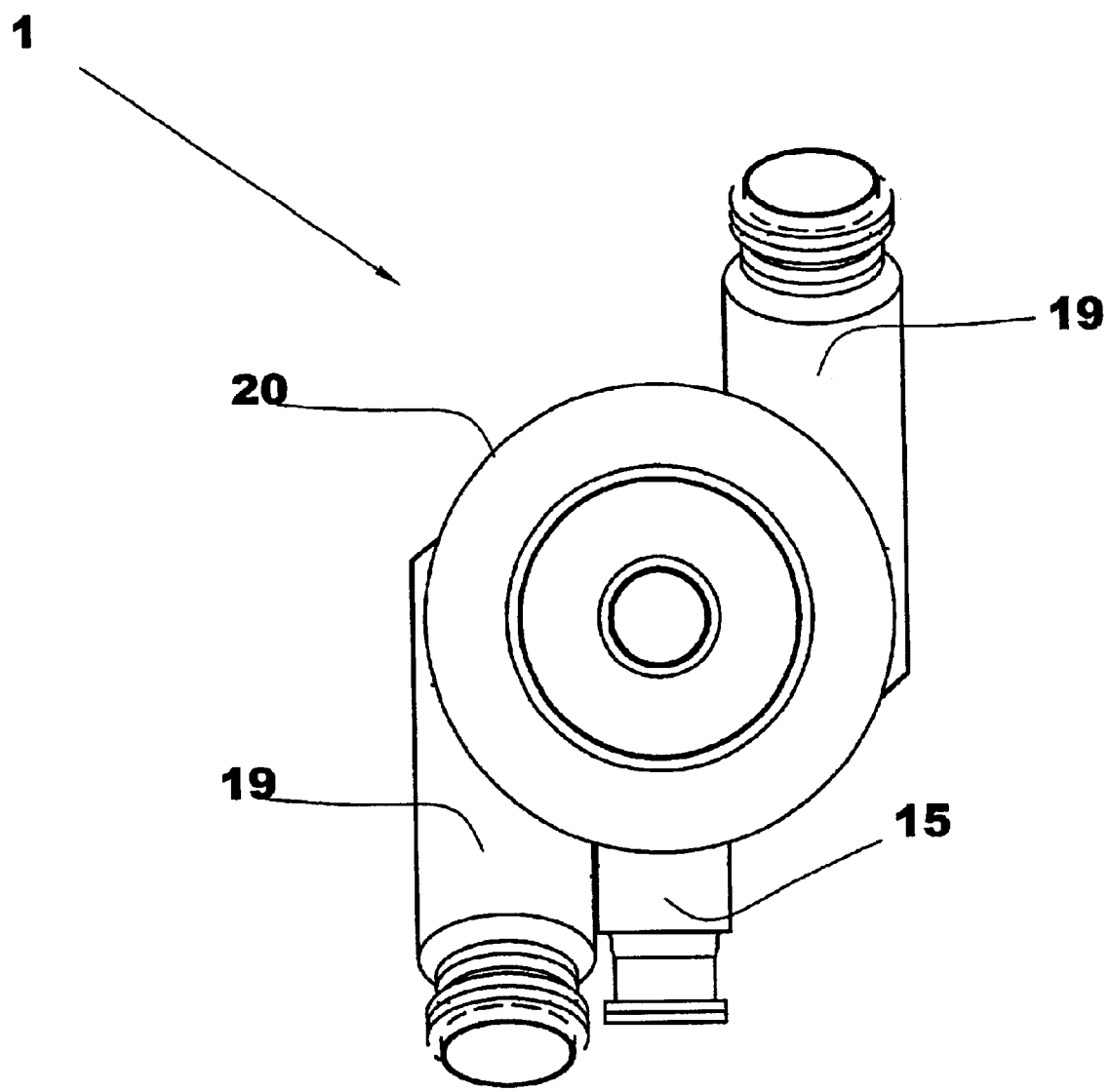
FIG. 5 is a plan view of the gasifier showing the tangentially fired burners.
Figure 6:
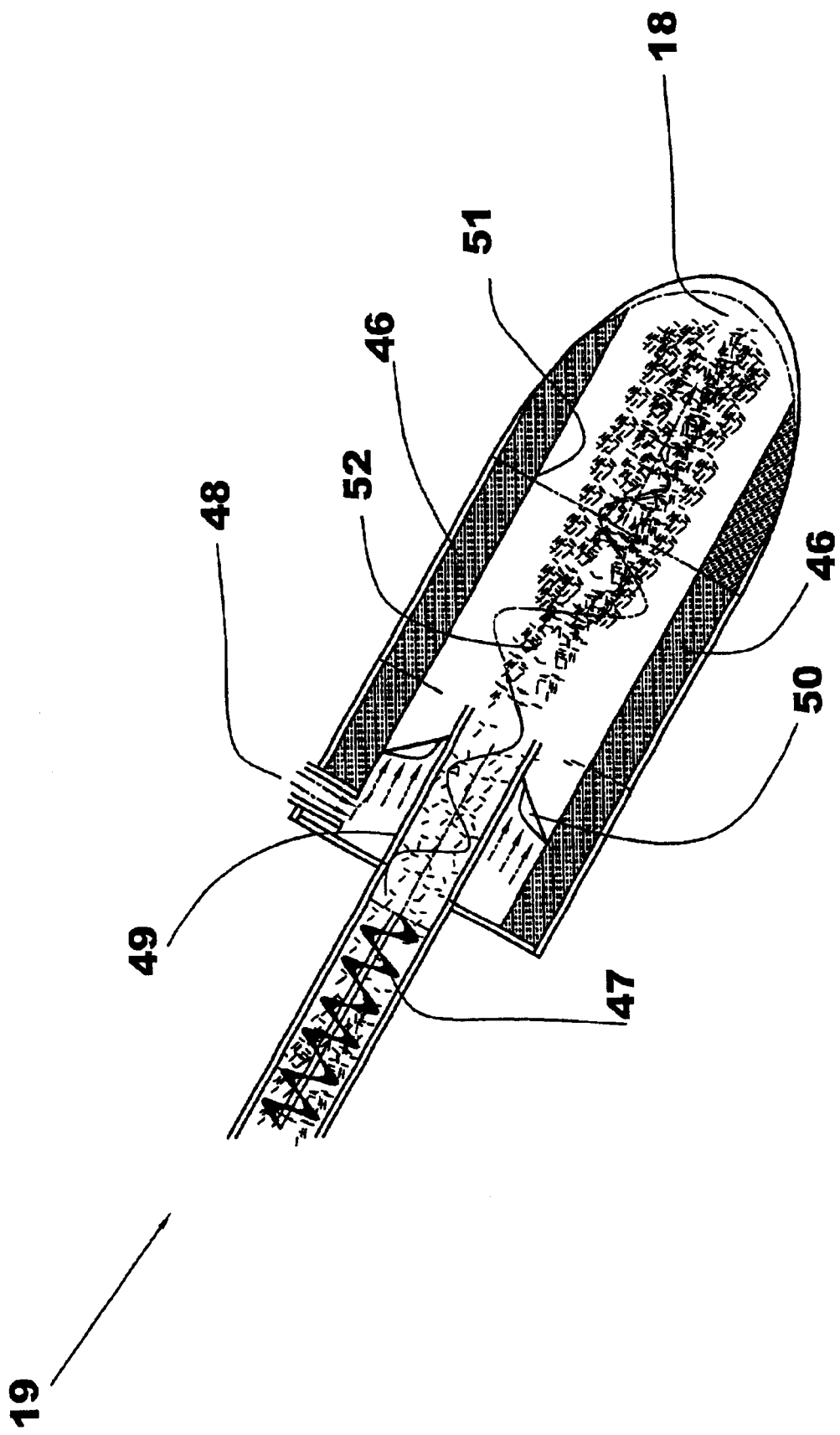
FIG. 6 is a cross-sectional view of a typical burner that may be used.

In FIG. 5 a top view of the gasifier 1 is shown. Two tangentially fired burners 19 are shown connecting to the main vessel 20. These two burners 19 partially oxidize and gasify fine or pulverized solid fuels, liquid fuels, or gaseous fuels such as natural gas. The burners typically have a circular cross section with a steel pipe forming the outer wall. The inside of the pipe is preferably lined with a high temperature ceramic 46 shown in FIG. 6. Normally the fine or pulverized solid fuels will be carried into the burners by a screw feeder 47. Inlet gases, oxygen or air and steam enter the burner at port 48. There are several known burner designs which may be used herein. A typical burner is shown in FIG. 6. The burner has annulus 49 and vanes 50. The critical area of wear in the burners is the ceramic surface 51. The vanes 50 cause the fuel and inlet gases to mix and oxidize and gasify in the zone 52. The fuel rapidly partially oxidizes and gasifies toward the center of the burner while some of the inlet gases continue to move down the wall providing a cooling protective layer for the ceramic. At the end of the burner 18, the gases and remaining fuel enter the plenum zone 17 of the gasifier. At this point the entrained flow gases pass through the lower fixed bed of the gasifier and exit the bed at zone 9 into the plenum 14 before leaving the gasifier at the exit pipe 15.

Having the entrained flow gases merge into the lower fixed bed provides the carbon necessary for the entrained flow products to reach gasification equilibrium. Additional steam is supplied at ports 53 shown in FIG. 1, which discharge in the zone designated 54 to control the gasification conditions and the desired temperature at point 9. The steam pipes 55 provide the needed steam. The use of steam at ports 53 provides important control of bed outlet temperature at zone 9, which may promote a partial water gas shift reaction to generate high quantities of hydrogen gases. This is how the hydrogen to carbon monoxide ratio is controlled. When steam is added to bring the bed to the appropriate temperature, hydrogen production may be maximized and gasifier thermal efficiency may be improved. If desired, additional steam can be added to the same zone to encourage cooling and the production of methane gases via a methanation reaction.

Normally gasification reactions slow and stop when temperatures drop toward and below about 1300° F. When steam is used to control the bed at zone 9 to temperatures in the range of 1400° F. to 1700° F., tar and oil destruction at plenum 14 may be optimized. If the throat 11 in the upper bed is performing properly, the additional high temperatures in the upper plenum used to destroy tars and oils, may not be needed. Persons skilled in the art will appreciate that the gasifier may be operated under various temperature profiles and various amounts of oxygen, air and steam depending upon the fuel feedstocks and the desired syngas output.

Figure 7:
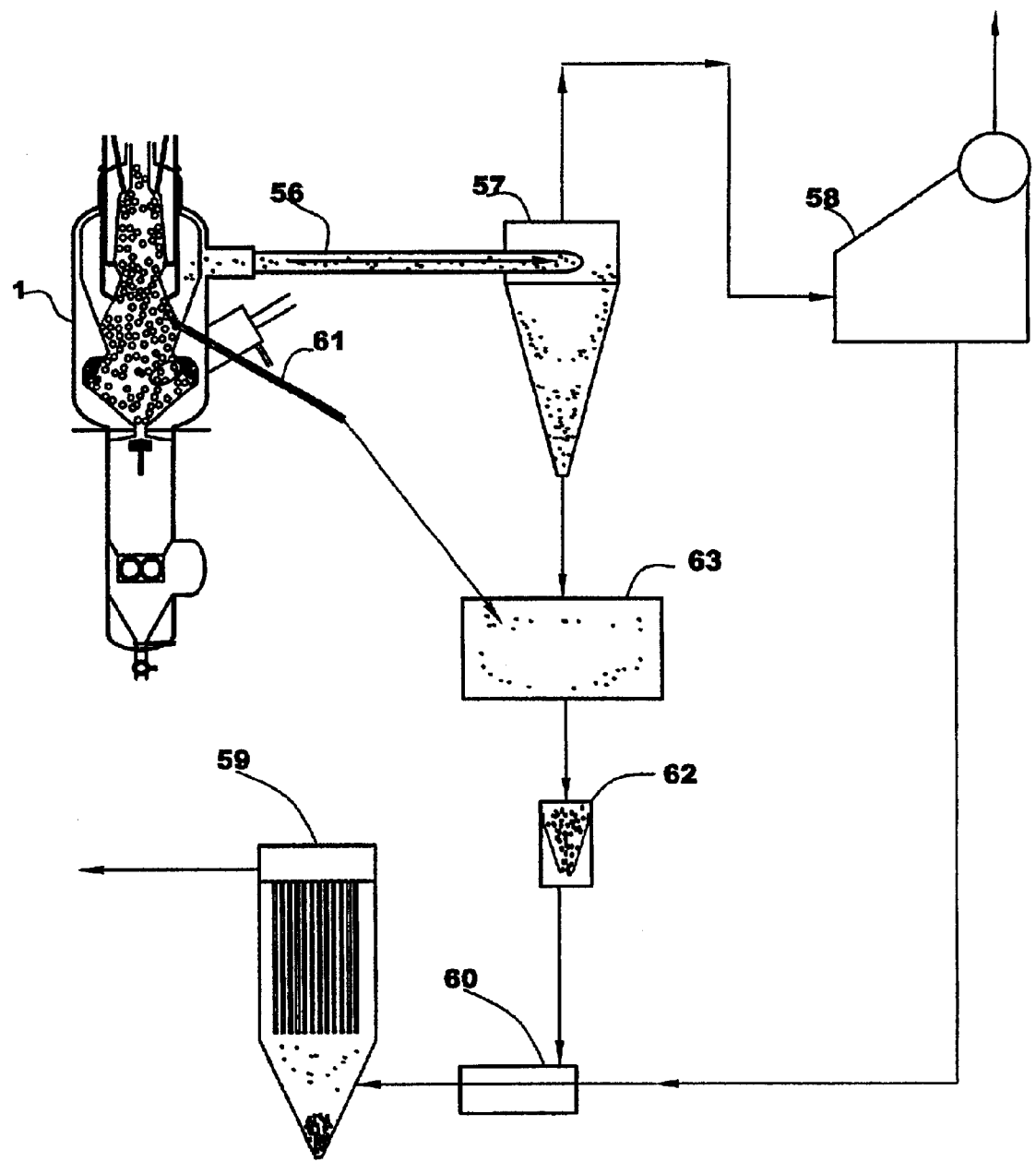
FIG. 7 is a process flow diagram depicting how activated carbon char may be collected from the gasifier for use as a syngas cleaning sorbent.

FIG. 7 depicts an important novelty within the scope of the present invention. FIG. 7 shows how activated carbon char particulate is captured from the either the effluent syngas stream or is extracted directly from the gasifier for use in a downstream baghouse. FIG. 7 shows the gasifier 1 with the main components of the syngas cleanup system. In this figure gasifier 1 has an exit pipe 56 that discharges the particulate laden hot syngas into a particulate removal system 57. The syngas then goes on to a heat recovery steam generator 58. The syngas, upon leaving the heat recovery steam generator 58 may be at about 300° F. The syngas then passes into a duel function baghouse 59, which not only removes all remaining particulates but also most all of the gaseous phase pollutants from the syngas including but not limited to pollutants such as: sulfur species, mercury, chlorides, heavy metals and others.

Sized activated carbon char is mixed with the incoming syngas in a mixer 60 just upstream of the baghouse 59. The mixing of the syngas and activated carbon char carries the activated carbon char into the baghouse and lines the bags. The activated carbon collects on the bags in the baghouse 59. This active carbon is very effective in absorbing the various pollutants at these lower temperatures in the range of 275° F. to 350° F. Commercial active carbon is very expensive, often over $1000 per ton, so it is not normally used for large-scale gaseous fuel cleanup. But in the present invention, the activated carbon char is a byproduct from the gasifier, and it is no more expensive than the fuel it came from.

There are two methods in which activated carbon is created within the gasifier. The first is in the upper fixed bed section of the gasifier at about point 13. The second area is in the entrained flow section. By intentionally sizing the fine solids to a size in which a portion of the particle is not fully gasified but is carried out as particulate with the syngas, this particle will have been exposed to very high temperatures to ensure activation.

The activated carbon char can leave the gasifier in two ways, either entrained with the effluent gas or directly removed from the fixed bed. Fine particles may be entrained with the effluent syngas by originating in the entrained flow section discussed above or from particulate that has broken off of larger coarse fuel from the fixed bed fuel regions. The second method of obtaining active carbon is by extraction tubes 61. The extraction tube is a slanted double pipe that penetrates the gasifier fuel bed just below bed surface at point 9. By creating a slightly lower pressure on the outside end the tube will act as a vacuum to bring the active carbon out. The pipe is double walled with a water jacket between the two pipes to cool the extraction tube 61. If the gasifier produces enough active carbon char entrained with the effluent syngas to meet the pollution control needs, the second method is not needed.

The extracted partially cooled active carbon char is then pulverized 62, before going on to the particulate cooler 63 where it may join with the collected material from the particulate removal system. The activated carbon char is then pulverized to the desired fineness at point 62. Pulverized activated carbon char is then injected into a mixer 60, which carries the active carbon char on into the baghouse 59.

By novelly using internally generated activated carbon char as a product in downstream for syngas cleaning, the present invention provides improved whole plant operating efficiency compared to other gasifier systems. Typically, thermal efficiency is measured by dividing the total amount of energy in the fuel feedstock into the energy in the resulting gaseous fuel output. Since the present invention may extract some of the carbon put into the gasifier as a byproduct, its total thermal efficiency measured by traditional methods would be lower than other comparable systems. A different result occurs by viewing the fuel (coal or other) as part fuel and part sorbent product rather than as all fuel. When the input fuel is measured, minus the extracted unconverted carbon used as sorbent, the thermal efficiencies of the present invention will be higher. Moreover, when efficiency is measured by the whole plant (including operating costs of downstream equipment required to clean syngas) against other commercial processes, the present invention shows superior overall plant efficiencies.

The fuel pieces in the bed at point 9, FIG. 3 of the gasifier are a mixture of ash and fully activated carbon char. The activated carbon char created in the present invention is not blinded by tars and oils that would normally exist in other fixed bed or some fluidized bed gasification systems. Different coarse fuels will have differing degrees of ability to convert to activated carbon. Fuels with lower ratios of volatiles to fixed carbon content may not be as well suited as fuels that have a higher ratio of volatiles to fixed carbon content.

Figure 8:
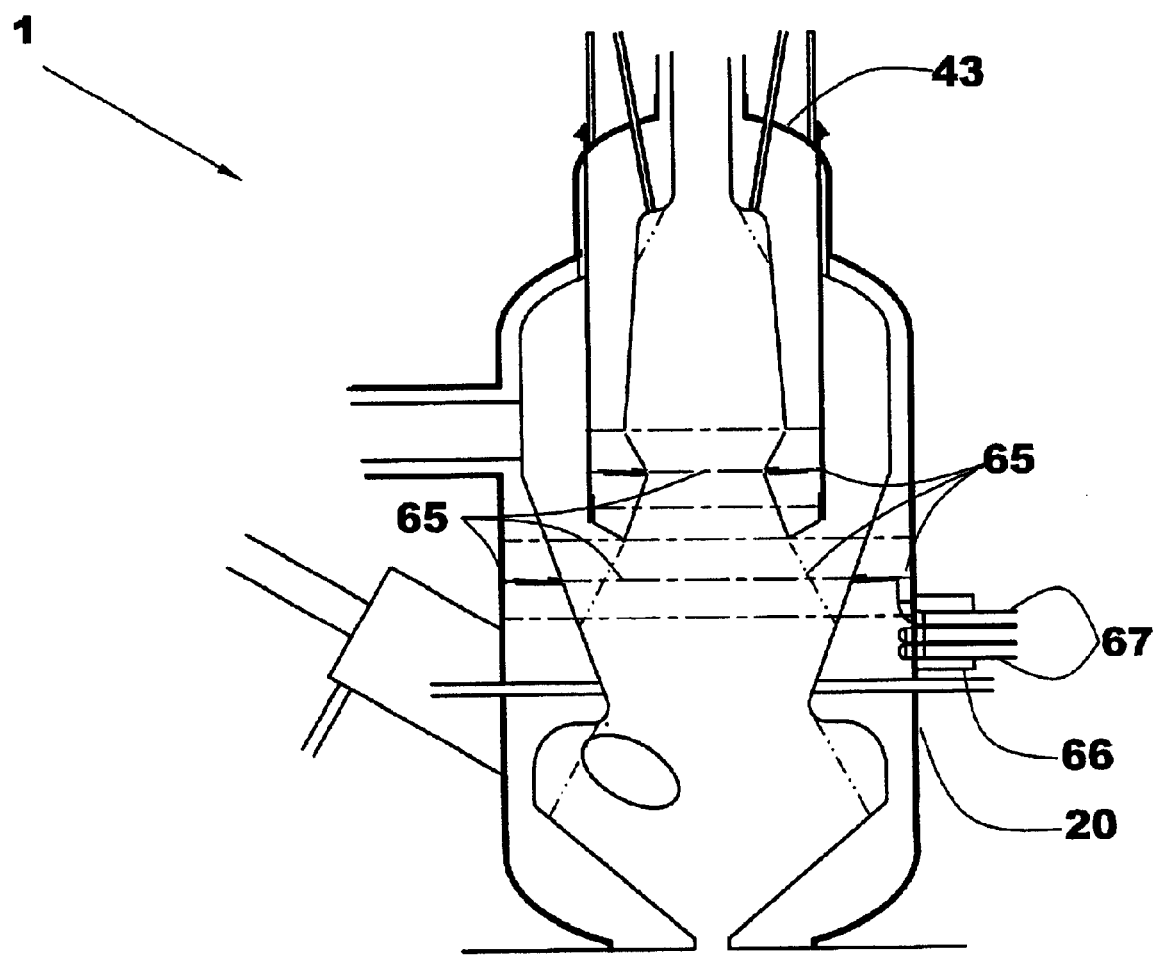
FIG. 8 is a cross-sectional view of the gasifier depicting how the pulsing system may be located in the gasifier.

Experience has shown that certain solid fuels in certain temperature ranges have caking properties that prevent them from flowing properly in the fixed bed environments. The ability of coarse fuels to properly move downward can be greatly improved by the present invention by providing small ports at selected sites to cause short duration jets of gas or pulses to agitate the coarse fuel and or ash. The gases selected for pulsating may be steam, recycled syngas, oxygen, nitrogen, air or others. By using several pulse ports in any given area, large pieces of caking fuel can be broken up to ensure continued proper gasification rates. The gas velocity of the gas pulses is preferably sufficiently high to break up the fuel. The ports 65 are designed for gas pulses reaching sonic velocity. In practice the gas velocity may be much less. FIG. 8 shows some typical pulse ports 65. The number of ports and location may be varied depending on the fuels selected. For example, one ring of pulse ports 65 is shown at the throat zone 11 and a second ring of pulse ports is shown near the bed gas exit zone 9. They can be located anywhere so as to properly agitate the fuel. The areas mentioned above are regions within the gasifier where fuel caking is probable.

The pulse ports consist of ceramic tubes that attach to pulse pipes 67. The pipes 67 are preferably attached to the vessel wall 20 or to the hood cylinder wall 42. In the case of the hood cylinder wall the pulse pipes may enter the gasifier through the hood top 43. For the vessel, several pulse pipes may enter through a piping port 66 on the side of the vessel 20. Vessel 20 can have several piping ports 66. The pulse piping is preferably attached to the vessel wall for support.

The use of pulsation for bed agitation eliminates the need for mechanical stirrers that are used in some prior fix bed gasifiers. Each pulse port can have varying degrees of pulse duration and frequency.

Figure 9:
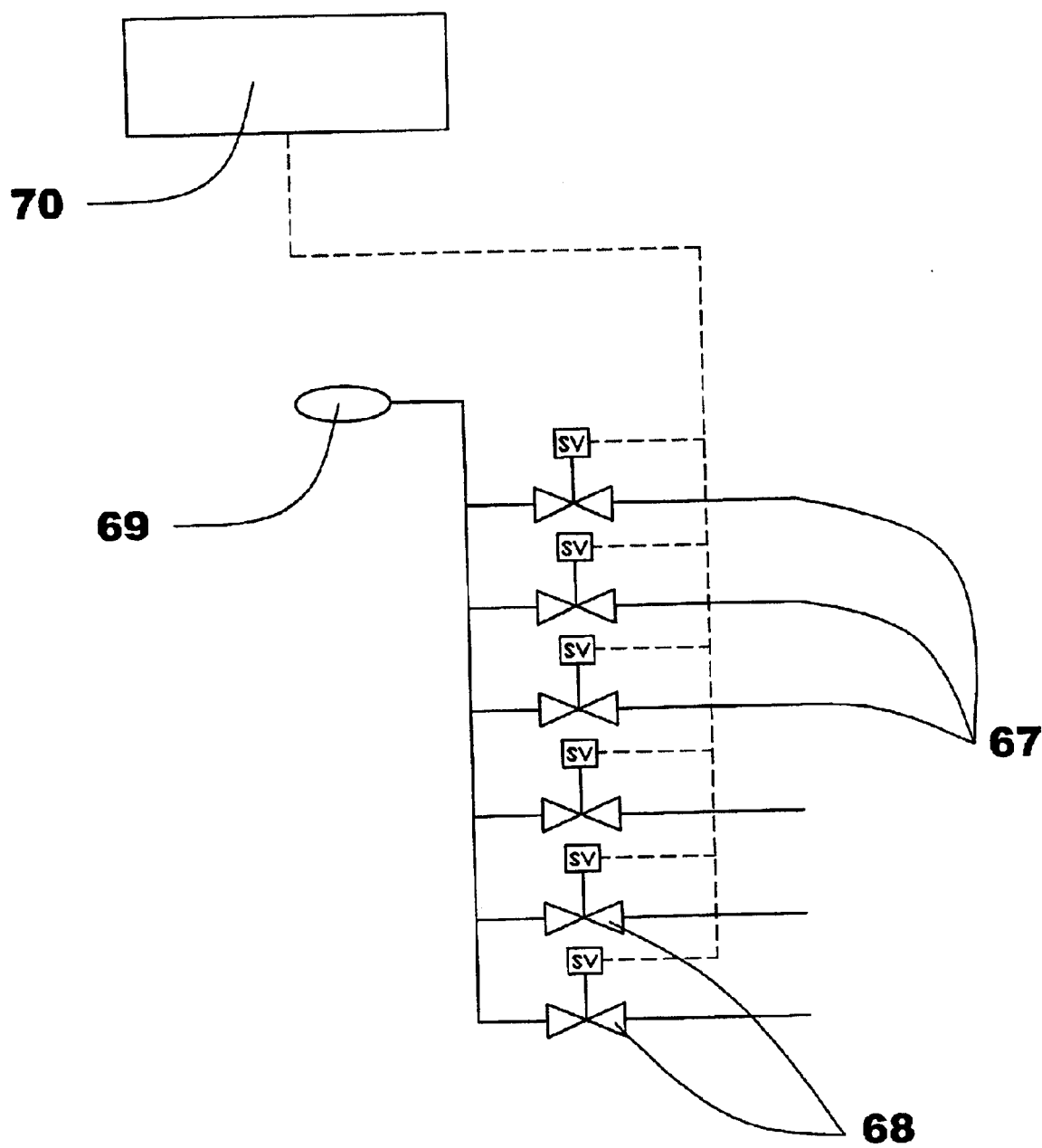
FIG. 9 is a diagram of the pulsing control center.

FIG. 9 shows a diagram of how the pulses to pipes 67 may be controlled. Each pipe 67 has a fast acting valve 68 such as a solenoid valve. The valves in each zone are connected to a common gas source 69, which is maintained at a set pressure. A computer controller 70 determines when each valve 68 opens and its duration. By this method the pulses can be adjusted throughout gasifier 1. The gas source 69 to the pulsing ports 65 can be different in both gas composition and pressure for different zones of gasifier 1.

In addition the table below depicts probable operating temperatures anticipated in different zones of the gasifier illustrated in FIGS. 1 and 6.

TABLE

Temperature Profile in Gasifier

| Point | Maximum Temperature F | Normal Temperature F | Minimum Temperature F |
|---|---|---|---|
| 2 | 500 | 200 | 100 |
| 4solids | 1200 | 300 | 200 |
| 4 gases | 1500 | 1000 | 500 |
| 11 | 2200 | 1800 | 1600 |
| 13 | 1800 | 1500 | 1300 |
| 9 | 1600 | 1300 | 1000 |
| 15 | 1550 | 1200 | 800 |
| 54 | 2200 | 1600 | 1300 |
| 18 | 2800 | 1800 | 1600 |
| 3 | 2900 | 2600 | 2200 |
| 48 | 1200 | 800 | 200 |
| 12 | 1200 | 800 | 200 |
| 7 | 1200 | 800 | 200 |

The following describes the presently preferred start up mode of the gasifier 1. The gasifier is first filled with coarse char fuel or fuel in which volatiles have been removed. The coarse char fills gasifier 1 from point 3 to a couple feet above point 2. Above the point 2 normal fuel can be added to the coarse fuel feeding system. Atmospheric temperature and pressure nitrogen gas is circulated through into the gasifier at inlet ports 6, 10, 19 and 25. The gas passes through the gasifier and out through exit pipe 15 and into the separator 57 and then through the heat exchangers 58. The superheater section of the heat exchangers 58 is left open to the boiler and the boiler is filled to proper drum level with boiler quality water. The nitrogen is slowly added until operating pressure is reached. The nitrogen on leaving the heat exchangers passes through a small startup blower that circulated the gases back into the gasifier 1 inlet ports 6, 10, 19 and 25. Downstream of the startup blower a burner fires oxygen and natural gas or propane into the nitrogen to slowly heat the gasifier as it circulates (about 100° F.). When the water in the boiler reaches operating pressure the superheater outlet valve maintains pressure by venting the excess steam to a condenser. For Integrated Gasification Combined Cycle (IGCC) plants that produce electricity as the primary product, this would be the main condenser of the steam turbine. When the gasifier bed reaches a temperature of about 1000° F., the temperature is held for two hours to allow the temperature across the ceramic walls to properly establish. With the hot nitrogen still circulating, small levels of oxygen are injected at ports 6, and 10 and propane and oxygen are injected at the burners 19 in a small igniter burner. Propane or natural gas is injected at 26 and oxygen at 25. The excess gas after passing through the heat exchanger is flared in the stack. The firing is slowly increased over about six hours to operating temperatures. When gas quality reaches acceptable composition the gas is rooted through the baghouse 59, which has been brought to operating temperature by hot bleed gas. The gasifier is now on line at minimum load. The gasifier may be slowly ramped up to full normal operating conditions discussed above.

What is claimed is:

1. A gasifier comprising:
spaced coarse and fine fuel inlet ports;
a fixed bed gasification section where coarse fuel is gasified;

an entrained flow gasification section where fine fuel is gasified; and a gas effluent port where gases generated from coarse fuel and fine fuel are collectively discharged.

2. The gasifier according to claim 1, wherein the fixed bed gasification section comprises:

an upper fixed bed section that receives coarse fuel from the coarse fuel inlet in which the coarse fuel is devolatilized to form volatilized gases which flow downward; and a lower fixed bed section.

3. The gasifier according to claim 2, further comprising:

an internal cross-section constriction in the upper fixed bed section; and an upper plenum disposed adjacent said constricted cross-section.

4. The gasifier according to claim 3, wherein effluent gas from the fixed bed gasification section and the entrained flow gasification section collect within the upper plenum and wherein the gas effluent site is located adjacent the upper plenum.

5. The gasifier according to claim 4, wherein the upper plenum is configured to provide an effluent gas residence time and operating temperature sufficient to crack tars and oils contained within the effluent gas.

6. The gasifier according to claim 2, wherein the upper fixed bed section is configured to operate at a temperature which converts a portion of the coarse fuel into activated carbon.

7. The gasifier according to claim 6, wherein activated carbon is entrained with the effluent gas.

8. The gasifier according to claim 7, further comprising an activated carbon collector to capture and remove activated carbon entrained in the effluent gas.

9. The gasifier according to claim 6, further comprising an activated carbon removal port to permit removal of activated carbon from the fixed bed gasification section.

10. The gasifier according to claim 9, further comprising a screw device in combination with the activated carbon removal port to permit removal of activated carbon.

11. The gasifier according to claim 1, wherein the entrained flow gasification section disposed in a lower plenum adjacent the lower fixed bed section which volatilizes fine fuel.

12. The gasifier according to claim 1, wherein fine fuel is fed into the entrained flow gasification section by at least one tangentially fired burner.

13. The gasifier according to claim 12, wherein the fine fuel is selected from pulverized solid fuel, liquid fuel, gaseous fuel, and combinations thereof.

14. The gasifier according to claim 1, wherein a portion of the fine fuel is sized to ensure incomplete carbon combustion of the fine fuel which results in the generation of activated carbon particles entrained with the effluent gas.

15. The gasifier according to claim 14, further comprising an activated carbon collector to capture and remove activated carbon entrained in the effluent gas.

16. The gasifier according to claim 1, which generates activated carbon entrained in the effluent gas, further comprising an activated carbon collector to capture and remove activated carbon from the effluent gas, further comprising pollution control equipment which contacts the effluent gas with said activated carbon to capture and remove pollutants from the effluent gas.

17. The gasifier according to claim 16, wherein the pollutants are selected from sulfur compounds, halogen compounds, and heavy metals.

18. The gasifier according to claim 1, further comprising a plurality of injection ports configured to introduce oxygen, steam, or air into different regions of the gasifier.

19. The gasifier according to claim 18, wherein the injection ports are configured to facilitate temperature control within the gasifier.

20. The gasifier according to claim 18, wherein the injection ports are configured to control the steam to oxygen ratio within the gasifier.

21. The gasifier according to claim 18, wherein the injection ports are configured to control the hydrogen to carbon monoxide ratio within the gasifier.

22. The gasifier according to claim 18, wherein the injection ports are configured to control the amount of oxygen, steam, or air in different sections of the gasifier to promote a partial water gas shift reaction.

23. The gasifier according to claim 22, wherein the injection ports are configured to control the amount of oxygen, steam, or air in different sections of the gasifier to control the temperature and to promote a methanation reaction.

24. The gasifier according to claim 1, configured to simultaneously process coarse fuel in the fixed bed gasification section and fine fuel in the entrained flow gasification section.

25. The gasifier according to claim 1, wherein the fine fuel is selected from pulverized solid fuel, liquid fuel, gaseous fuel, and combinations thereof.

26. The gasifier according to claim 1, further comprising a plurality of pulsating jets disposed about the lower fixed bed section which agitate coarse fuel or ash within the fixed bed section.

27. The gasifier according to claim 26, wherein the pulsating jets inject pressurized gas pulses.

28. The gasifier according to claim 27, wherein the gas pulses comprise pulses of air, oxygen, steam, carbon dioxide, gaseous fuel, or recycled effluent gas.

29. The gasifier according to claim 1, configured to operate using only coarse fuel in the fixed bed gasification section.

30. A gasifier having a two-stage fixed bed gasification section and an entrained flow gasification section comprising:

a coarse fuel inlet;

a two-stage fixed bed gasification section that receives coarse fuel from the coarse fuel inlet, said fixed bed gasification section comprising:

an upper fixed bed section in which the coarse fuel is devolatilized to form volatilized gases which flow downward;

an internal cross-section constriction in the upper fixed bed section;

a lower fixed bed section; and an upper plenum disposed adjacent the internal cross-section constriction;

an entrained flow gasification section disposed in a lower plenum adjacent the lower fixed bed section which volatilizes fine fuel, wherein fine fuel is fed into the entrained flow gasification section by at least one tangentially fired burner;

a plurality of injection ports configured to introduce oxygen, steam, or air into different sections of the gasifier;

a plurality of pulsating jets disposed about the lower fixed bed section which agitate coarse fuel or ash within the fixed bed section; and a gas effluent site from which gases obtained from the coarse and fine fuels are collectively discharged, wherein effluent gas from the fixed bed gasification section and the entrained flow gasification section collect within the upper plenum and wherein the gas effluent site is located adjacent the upper plenum.

31. The gasifier according to claim 30, wherein the fine fuel is selected from pulverized solid fuel, liquid fuel, gaseous fuel, and combinations thereof.

32. The gasifier according to claim 30, wherein the injection ports are configured to facilitate temperature control within the gasifier.

33. The gasifier according to claim 30, wherein the injection ports are configured to control the steam to oxygen ratio within the gasifier.

34. The gasifier according to claim 30, wherein the injection ports are configured to control the hydrogen to carbon monoxide ratio within the gasifier.

35. The gasifier according to claim 30, wherein the injection ports are configured to control the amount of oxygen, steam, or air in different sections of the gasifier to promote a partial water gas shift reaction.

36. The gasifier according to claim 35, wherein the injection ports are configured to control the amount of oxygen, steam, or air in different sections of the gasifier to control the temperature and to promote a methanation reaction.

37. The gasifier according to claim 30, wherein the upper fixed bed section is configured to operate at a temperature which converts a portion of the coarse fuel into activated carbon.

38. The gasifier according to claim 37, wherein activated carbon is entrained with the effluent gas.

39. The gasifier according to claim 38, further comprising an activated carbon collector to capture and remove activated carbon entrained in the effluent gas.

40. The gasifier according to claim 37, further comprising an activated carbon removal port to permit removal of activated carbon from the fixed bed gasification section.

41. The gasifier according to claim 40, further comprising a screw device in combination with the activated carbon removal port to permit removal of activated carbon.

42. The gasifier according to claim 30, wherein a portion of the fine fuel is sized to ensure incomplete carbon combustion of the fine fuel which results in the generation of activated carbon particles entrained with the effluent gas.

43. The gasifier according to claim 42, further comprising an activated carbon collector to capture and remove activated carbon entrained in the effluent gas.

44. The gasifier according to claim 30, which generates activated carbon entrained in the effluent gas, further comprising an activated carbon collector to capture and remove activated carbon from the effluent gas, further comprising pollution control equipment which contacts the effluent gas with said activated carbon to capture and remove pollutants from the effluent gas.

45. The gasifier according to claim 44, wherein the pollutants are selected from sulfur compounds, halogen compounds, and heavy metals.

46. The gasifier according to claim 30, wherein the pulsating jets inject pressurized gas pulses.

47. The gasifier according to claim 46, wherein the gas pulses comprise pulses of air, oxygen, steam, carbon dioxide, gaseous fuel, or recycled effluent gas.

48. The gasifier according to claim 30, configured to simultaneously process coarse fuel in the fixed bed gasification section and fine fuel in the entrained flow gasification section.

49. The gasifier according to claim 30, configured to operate using only coarse fuel in the fixed bed gasification section.

50. The gasifier according to claim 30, wherein the upper plenum is configured to provide an effluent gas residence time and operating temperature sufficient to crack tars and oils contained within the effluent gas.

51. A gasifier comprising:
a coarse fuel inlet;
a two-stage fixed bed gasification section that receives coarse fuel from the coarse fuel inlet, said fixed bed gasification section comprising:
an upper fixed bed section in which the coarse fuel is devolatilized to form volatilized gases which flow downward;
an internal cross-section constriction in the upper fixed bed section;
a lower fixed bed section; and
an upper plenum disposed adjacent the internal cross-section constriction;
a plurality of injection ports configured to introduce oxygen, steam, or air into different sections of the gasifier, wherein a portion of the ports are located adjacent the coarse fuel inlet; and
a gas effluent site from which gases obtained from the coarse fuel is discharged, wherein effluent gas from the fixed bed gasification section collect within the upper plenum and wherein the gas effluent site is located adjacent the upper plenum.

52. The gasifier according to claim 51, wherein the upper plenum is configured to provide an effluent gas residence time and operating temperature sufficient to crack tars and oils contained within the effluent gas.

53. The gasifier according to claim 51, wherein the upper fixed bed section is configured to operate at a temperature which converts a portion of the coarse fuel into activated carbon.

54. The gasifier according to claim 53, wherein activated carbon is entrained with the effluent gas.

55. The gasifier according to claim 54, further comprising an activated carbon collector to capture and remove activated carbon entrained in the effluent gas.

56. The gasifier according to claim 53, further comprising an activated carbon removal port to permit removal of activated carbon from the fixed bed gasification section.

57. The gasifier according to claim 56, further comprising a screw device in combination with the activated carbon removal port to permit removal of activated carbon.

58. The gasifier according to claim 51, which generates activated carbon entrained in the effluent gas, further comprising an activated carbon collector to capture and remove activated carbon from the effluent gas, further comprising pollution control equipment which contacts the effluent gas with said activated carbon to capture and remove pollutants from the effluent gas.

59. The gasifier according to claim 58, wherein the pollutants are selected from sulfur compounds, halogen compounds, and heavy metals.

60. The gasifier according to claim 51, further comprising a plurality of injection ports configured to introduce oxygen, steam, or air into different regions of the gasifier.

61. The gasifier according to claim 60, wherein the injection ports are configured to facilitate temperature control within the gasifier.

62. The gasifier according to claim 60, wherein the injection ports are configured to control the steam to oxygen ratio within the gasifier.

63. The gasifier according to claim 60, wherein the injection ports are configured to control the hydrogen to carbon monoxide ratio within the gasifier.

64. The gasifier according to claim 60, wherein the injection ports are configured to control the amount of oxygen, steam, or air in different sections of the gasifier to promote a partial water gas shift reaction.

65. The gasifier according to claim 64, wherein the injection ports are configured to control the amount of oxygen, steam, or air in different sections of the gasifier to control the temperature and to promote a methanation reaction.

66. The gasifier according to claim 51, further comprising a plurality of pulsating jets disposed about the lower fixed bed section which agitate coarse fuel or ash within the fixed bed section.

67. The gasifier according to claim 67, wherein the pulsating jets inject pressurized gas pulses.

68. The gasifier according to claim 68, wherein the gas pulses comprise pulses of air, oxygen, steam, carbon dioxide, gaseous fuel, or recycled effluent gas.

69. A method for removing vapor phase pollutants from effluent gas produced by the gasification of carbonaceous fuel, wherein the gasification of carbonaceous fuel also produces activated carbon as a byproduct, said method comprising the steps of:
supplying that activated carbon sorbent to a gas filtration vessel having a filter media therein until the filter media is coated with a layer of sorbent; and
introducing the effluent gas into the gas filtration vessel, wherein a sufficient amount of activated carbon sorbent is supplied to the gas filtration vessel to coat the filter media and facilitate intimate contact between the activated carbon sorbent and vapor phase pollutants and thus removing vapor phase pollutants from the effluent gas.

70. A method of gasifying a carbonaceous fuel feedstock comprising the steps of:
feeding coarse fuel into a gasifier having a two-stage fixed bed gasification section comprising:
an upper fixed bed section that receives the coarse fuel, wherein the upper fixed bed section operates at a temperature sufficient to devolatilize the coarse fuel and form volatilized gases which flow downward;
an internal cross-section constriction in the upper fixed bed section;
a lower fixed bed section; and
an upper plenum disposed adjacent said constricted cross-section;
introducing oxygen, steam, or air into the upper fixed bed section and lower fixed bed section control the temperature within the gasifier; and
withdrawing effluent gas from the gasifier.

71. The method of gasifying carbonaceous fuel according to claim 70, wherein the amount of oxygen, steam, or air introduced into the fixed bed gasification section is varied to control the steam to oxygen ratio within the gasification chamber.

72. The method of gasifying carbonaceous fuel according to claim 70, wherein the amount of oxygen, steam, or air introduced into the fixed bed gasification section is varied to control the hydrogen to carbon monoxide ratio within the gasifier.

73. The method of gasifying carbonaceous fuel according to claim 70, wherein the amount of oxygen, steam, or air introduced into the fixed bed gasification section is varied to promote a partial water gas shift reaction.

74. The method of gasifying carbonaceous fuel according to claim 73, wherein the amount of oxygen, steam, or air introduced into the fixed bed gasification section is varied to control the temperature and to promote a methanation reaction.

75. The method of gasifying carbonaceous fuel according to claim 70, further comprising the step of feeding fine fuel into an entrained flow gasification section where the fine fuel is gasified.

76. The method of gasifying carbonaceous fuel according to claim 75, wherein the entrained flow gasification section is disposed in a lower plenum adjacent the lower fixed bed section.

77. The method of gasifying carbonaceous fuel according to claim 75, wherein fine fuel is fed into the entrained flow gasification section by at least one tangentially fired burner.

78. The method of gasifying carbonaceous fuel according to claim 70, wherein effluent gas from the fixed bed gasification section collects within the upper plenum and wherein the effluent gas is withdrawn from the upper plenum.

79. The method of gasifying carbonaceous fuel according to claim 78, further comprising the step of maintaining the effluent gas within the upper plenum for a sufficient gas residence time and operating temperature to crack tars and oils contained within the effluent gas.

80. The method of gasifying carbonaceous fuel according to claim 70, wherein the upper fixed bed section is operated at a temperature which converts a portion of the coarse fuel into activated carbon.

81. The method of gasifying carbonaceous fuel according to claim 80, wherein activated carbon is entrained with the effluent gas.

82. The method of gasifying carbonaceous fuel according to claim 81, further comprising the step of capturing and removing activated carbon entrained in the effluent gas.

83. The method of gasifying carbonaceous fuel according to claim 80, further comprising the step of removing activated carbon from the fixed bed gasification section.

84. The method of gasifying carbonaceous fuel according to claim 75, wherein a portion of the fine fuel is sized to ensure incomplete carbon combustion of the fine fuel which results in the generation of activated carbon particles entrained with the effluent gas.

85. The method of gasifying carbonaceous fuel according to claim 84, further comprising the step of capturing and removing activated carbon entrained in the effluent gas.

86. The method of gasifying carbonaceous fuel according to claim 70, further comprising the steps of:
generating activated carbon;
capturing and removing activated carbon from either the effluent gas or lower fixed bed section;
introducing activated carbon and effluent gas into pollution control equipment wherein the activated carbon contacts the effluent gas and captures and removes pollutants from the effluent gas.

87. The method of gasifying carbonaceous fuel according to claim 86, wherein the pollutants are selected from sulfur compounds, halogen compounds, and heavy metals.

88. The method of gasifying carbonaceous fuel according to claim 86, wherein the pollution control equipment comprises a baghouse.

89. A method of producing activated carbon in a gasifier device comprising the steps of:
feeding coarse fuel into a gasifier having a fixed bed gasification section comprising:
an upper fixed bed section that receives the coarse fuel, wherein the upper fixed bed section operates at a temperature sufficient to devolatilize the coarse fuel and form volatilized gases which flow downward;

an internal cross-section constriction in the upper fixed bed section; and a lower fixed bed section through which volatilized gases flow upward;

introducing oxygen, steam, or air into the upper fixed bed section and lower fixed bed section control the temperature within the gasifier, wherein the upper fixed bed section is operated at a temperature which converts a portion of the coarse fuel into activated carbon.

90. The method of producing activated carbon according to claim 89, further comprising the step of withdrawing effluent gas from the gasifier, wherein the activated carbon is entrained with the effluent gas.

91. The method of producing activated carbon according to claim 90, further comprising the step of capturing and removing activated carbon entrained in the effluent gas.

92. The method of producing activated carbon according to claim 89, further comprising the step of removing activated carbon from the fixed bed gasification section.

93. The method of producing activated carbon according to claim 89, further comprising the step of feeding fine fuel into an entrained flow gasification section where the fine fuel is gasified, wherein a portion of the fine fuel is sized to ensure incomplete carbon combustion of the fine fuel which results in the generation of activated carbon particles entrained with the effluent gas.

94. The method of producing activated carbon according to claim 93, further comprising the step of capturing and removing activated carbon entrained in the effluent gas.

95. The method of producing activated carbon according to claim 93, wherein the entrained flow gasification section is disposed in a lower plenum adjacent the lower fixed bed section.

96. A method for removing vapor phase pollutants from effluent gas produced by the gasification of carbonaceous fuel, wherein the gasification of carbonaceous fuel also produces activated carbon as a byproduct, said method comprising the steps of:

supplying that activated carbon sorbent to a baghouse having a filter bag therein until the filter bag is coated with a layer of sorbent; and introducing the effluent gas into the baghouse, wherein a sufficient amount of activated carbon sorbent is supplied to the baghouse to coat the filter bag and facilitate intimate contact between the activated carbon sorbent and vapor phase pollutants and thus removing vapor phase pollutants from the effluent gas.

97. A gasifier that produces activated carbon comprising:

a coarse and fuel inlet port;

a fixed bed gasification section where coarse fuel is gasified and which is configured to operate at a temperature that devolatilizes coarse fuel to form volatilized gases, said fixed bed gasification section further comprising a carbon activation zone configured to operate at a temperature that destroys and cracks tars and oils remaining in the volatilized gases and coarse fuel, thereby converting the coarse fuel into activated carbon;

a plurality of injection ports configured to introduce oxygen, steam, or air into different sections of the gasifier to control operating conditions within the gasifier; and a gas effluent port where gases generated from coarse fuel are discharged.

98. The gasifier that produces activated carbon according to claim 97, wherein the discharged gases comprise entrained activated carbon and further comprising an activated carbon collector to capture and remove activated carbon entrained in the discharged gases.

99. The gasifier that produces activated carbon according to claim 97, further comprising an activated carbon removal port to permit removal of activated carbon from the fixed bed gasification section.

100. A gasifier that produces activated carbon comprising:

a fine fuel inlet port;

an entrained flow gasification section where fine fuel is gasified, wherein a portion of the fine fuel is sized to ensure incomplete carbon combustion of the fine fuel which results in the generation of activated carbon particles entrained with the effluent gas; and a gas effluent port where gases generated from fine fuel are discharged, wherein the discharged gases comprise entrained activated carbon.

* * * * *

UNITED STATES PATENT AND TRADEMARK OFFICE
CERTIFICATE OF CORRECTION

| | |
|---|---|
| PATENT NO. | : 6,960,234 B2 |
| APPLICATION NO. | : 10/005279 |
| DATED | : November 1, 2005 |
| INVENTOR(S) | : Scott E. Hassett | it is certified that error appears in the above-identified patent and that said Letters Patent is hereby corrected as shown below:

In line 12 of the abstract, please delete "Activated carbon may" and replace it with --Activated carbon char may--.

In line 14 of the abstract, please delete "activated carbon may" and replace it with "activated carbon char may--.

In column 6 line 36, please delete "oil" and replace it with --oils--.

In column 7 line 25, please delete "activated carbon within" and replace it with --activated carbon char within--.

In column 7 line 26, please delete "activated carbon may" and replace it with --activated carbon char may--.

In column 10 line 22, please delete "active carbon is" and replace it with --activated carbon char is--.

In column 10 line 30, please delete "activated carbon is" and replace it with --activated carbon char is--.

In column 10 line 44, please delete "active carbon is" and replace it with --activated carbon char is--.

In column 10 line 49, please delete "active carbon out" and replace it with --activated carbon char out--.

In column 10 line 52, please delete "active carbon char" and replace it with --activated carbon char--.

In column 10 line 55, please delete "active carbon char" and replace it with --activated carbon char--.

In Column 10 line 61, please delete "active carbon char" and replace it with --activated carbon char--.

In column 11 line 21, please delete "activated carbon." and replace it with --activated carbon char.--

In column 13 line 29, please delete "activated carbon." and replace it with --activated carbon char.--

UNITED STATES PATENT AND TRADEMARK OFFICE
CERTIFICATE OF CORRECTION

| | |
|---|---|
| PATENT NO. | : 6,960,234 B2 |
| APPLICATION NO. | : 10/005279 |
| DATED | : November 1, 2005 |
| INVENTOR(S) | : Scott E. Hassett | it is certified that error appears in the above-identified patent and that said Letters Patent is hereby corrected as shown below:

In column 13 line 31, please delete "activated carbon is" and replace it with --activated carbon char is--.

In column 13 line 33, please delete "activated carbon collector" and replace it with --activated carbon char collector--.

In column 13 line 34, please delete "activated carbon entrained" and replace it with --activated carbon char entrained--.

In column 13 line 36, please delete "activated carbon removal" and replace it with --activated carbon char removal--.

In column 13 line 39, please delete "activated carbon removal" and replace it with --activated carbon char removal--.

In column 13 line 40, please delete "activated carbon." and replace it with --activated carbon char.--

In column 13 line 54, please delete "activated carbon particles" and replace it with --activated carbon char particles--.

In column 13 line 56, please delete "activated carbon collector" and replace it with --activated carbon char collector--.

In column 13 line 57, please delete "activated carbon entrained" and replace it with --activated carbon char entrained--.

In column 13 line 59 please delete "activated carbon entrained" and replace it with --activated carbon char entrained--.

In column 13 line 60, please delete "activated carbon collector" and replace it with --activated carbon char collector--.

In column 13 line 61, please delete "activated carbon from" and replace it with --activated carbon char from--.

In column 13 line 63, please delete "activated carbon to" and replace it with --activated carbon char to--.

In column 15 line 30, please delete "activated carbon." and replace it with --activated carbon char.--

UNITED STATES PATENT AND TRADEMARK OFFICE
CERTIFICATE OF CORRECTION

PATENT NO.        : 6,960,234 B2
APPLICATION NO. : 10/005279
DATED             : November 1, 2005
INVENTOR(S)       : Scott E. Hassett it is certified that error appears in the above-identified patent and that said Letters Patent is hereby corrected as shown below:

In column 15 line 32, please delete "activated carbon is" and replace it with --activated carbon char is--.

In column 15 line 34, please delete "activated carbon collector" and replace it with --activated carbon char collector--.

In column 15 line 35, please delete "activated carbon entrained" and replace it with --activated carbon char entrained--.

In column 15 line 37, please delete "activated carbon removal" and replace it with --activated carbon char removal--.

In column 15 line 38, please delete "activated carbon from" and replace it with --activated carbon char from--.

In column 15 line 40, please delete "activated carbon removal" and replace it with --activated carbon char removal--.

In column 15 line 41, please delete "activated carbon." and replace it with --activated carbon char.--

In column 15 line 45, please delete "activated carbon particles" and replace it with --activated carbon char particles--.

In column 15 line 47, please delete "activated carbon collector" and replace it with --activated carbon char collector--.

In column 15 line 48, please delete "activated carbon entrained" and replace it with --activated carbon char entrained--.

In column 15 line 50, please delete "activated carbon entrained" and replace it with --activated carbon char entrained--.

In column 15 line 51, please delete "activated carbon collector" and replace it with --activated carbon char collector--.

In column 15 line 52, please delete "activated carbon from" and replace it with --activated carbon char from--.

In column 15 line 54, please delete "activated carbon to" and replace it with --activated carbon char to--.

UNITED STATES PATENT AND TRADEMARK OFFICE
CERTIFICATE OF CORRECTION

| | |
|---|---|
| PATENT NO. | : 6,960,234 B2 |
| APPLICATION NO. | : 10/005279 |
| DATED | : November 1, 2005 |
| INVENTOR(S) | : Scott E. Hassett | it is certified that error appears in the above-identified patent and that said Letters Patent is hereby corrected as shown below:

In column 16 line 37, please delete "activated carbon." and replace it with --activated carbon char.--

In column 16 line 39, please delete "activated carbon is" and replace it with --activated carbon char is--.

In column 16 line 41, please delete "activated carbon collector" and replaced with --activated carbon char collector--.

In column 16 line 42, please delete "activated carbon entrained" and replace it with --activated carbon char entrained--.

In column 16 line 44, please delete "activated carbon removal" and replace it with --activated carbon char removal--.

In column 16 line 45, please delete "activated carbon from" and replace it with --activated carbon char from--.

In column 16 line 47, please delete "activated carbon removal" and replace it with --activated carbon char removal--.

In column 16 line 48, please delete "activated carbon." and replace it with --activated carbon char.--

In column 16 line 50, please delete "activated carbon entrained" and replace it with --activated carbon char entrained--.

In column 16 line 51, please delete "activated carbon collector" and replace it with --activated carbon char collector--.

In column 16 line 52, please delete "activated carbon from" and replace it with --activated carbon char from--.

In column 16 line 54, please delete "activated carbon to" and replace it with --activated carbon char to--.

In column 17 line 17, please delete "to claim 67" and replace it with --to claim 66--.

In column 17 line 19, please delete "to claim 68" and replace it with --to claim 66--.

UNITED STATES PATENT AND TRADEMARK OFFICE
CERTIFICATE OF CORRECTION

| | |
|---|---|
| PATENT NO. | : 6,960,234 B2 |
| APPLICATION NO. | : 10/005279 |
| DATED | : November 1, 2005 |
| INVENTOR(S) | : Scott E. Hassett | it is certified that error appears in the above-identified patent and that said Letters Patent is hereby corrected as shown below:

In column 17 line 25, please delete "activated carbon as" and replace it with --activated carbon char as--.

In column 17 line 27, please delete "activated carbon sorbent" and replace it with --activated carbon char sorbent--.

In column 17 line 31, please delete "activated carbon sorbent" and replace it with --activated carbon char sorbent--.

In column 17 line 34, please delete "activated carbon sorbent" and replace it with --activated carbon char sorbent--.

In column 18 line 29, please delete "activated carbon." and replace it with --activated carbon char.--

In column 18 line 31, please delete "activated carbon is" and replace it with --activated carbon char is--.

In column 18 line 35, please delete "activated carbon entrained" and replace it with --activated carbon char entrained--.

In column 18 line 38, please delete "activated carbon from" and replace it with --activated carbon char from--.

In column 18 line 42, please delete "activated carbon particles" and replace it with --activated carbon char particles--.

In column 18 line 46, please delete "activated carbon entrained" and replace it with --activated carbon char entrained--.

In column 18 line 49, please delete "activated carbon;" and replace it with --activated carbon char;--

In column 18 line 50, please delete "activated carbon from" and replace it with --activated carbon char from--.

In column 18 line 52, please delete "activated carbon and" and replace it with --activated carbon char and--.

In column 18 line 53, please delete "activated carbon contacts" and replace it with --activated carbon char contacts--.

UNITED STATES PATENT AND TRADEMARK OFFICE
CERTIFICATE OF CORRECTION

| | | |
|---|---|---|
| PATENT NO. | : 6,960,234 B2 | |
| APPLICATION NO. | : 10/005279 | |
| DATED | : November 1, 2005 | |
| INVENTOR(S) | : Scott E. Hassett | | it is certified that error appears in the above-identified patent and that said Letters Patent is hereby corrected as shown below:

In column 18 line 62, please delete "activated carbon in" and replace it with --activated carbon char in--.

In column 19 line 11, please delete "activated carbon." and replace it with --activated carbon char.--

In column 19 line 12, please delete "activated carbon according" and replace it with --activated carbon char according--.

In column 19 line 14, please delete "activated carbon is" and replace it with --activated carbon char is--.

In column 19 line 16, please delete "activated carbon according" and replace it with --activated carbon char according--.

In column 19 line 18, please delete "activated carbon entrained" and replace it with --activated carbon char entrained--.

In column 19 line 19, please delete "activated carbon according" and replace it with --activated carbon char according--.

In column 19 line 21, please delete "activated carbon from" and replace it with --activated carbon char from--.

In column 19 line 22, please delete "activated carbon according" and replace it with --activated carbon char according--.

In column 19 line 27, please delete "activated carbon particles" and replace it with --activated carbon char particles--.

In column 19 line 29, please delete "activated carbon according" and replace it with --activated carbon char according--.

In column 19 line 31, please delete "activated carbon entrained" and replace it with --activated carbon char entrained--.

In column 19 line 32, please delete "activated carbon according" and replace it with --activated carbon char according--.

In column 19 line 39, please delete "activated carbon as" and replace it with --activated carbon char as--.

UNITED STATES PATENT AND TRADEMARK OFFICE
CERTIFICATE OF CORRECTION

PATENT NO. : 6,960,234 B2
APPLICATION NO. : 10/005279
DATED : November 1, 2005
INVENTOR(S) : Scott E. Hassett it is certified that error appears in the above-identified patent and that said Letters Patent is hereby corrected as shown below:

In column 19 line 41, please delete "activated carbon sorbent" and replace it with --activated carbon char sorbent--.

In column 19 line 45, please delete "activated carbon sorbent" and replace it with --activated carbon char sorbent--.

In column 20 line 2, please delete "activated carbon sorbent" and replace it with --activated carbon char sorbent--.

In column 20 line 5, please delete "activated carbon comprising;" and replace it with --activated carbon char comprising;--

In column 20 line 16, please delete "activated carbon;" and replace it with --activated carbon char;--

In column 20 line 24, please delete "activated carbon according" and replace it with --activated carbon char according--.

In column 20 line 26, please delete "activated carbon and" and replace it with --activated carbon char and--.

In column 20 line 27, please delete "activated carbon collector" and replace it with --activated carbon char collector--.

In column 20 line 28, please delete "activated carbon entrained" and replace it with --activated carbon char entrained--.

In column 20 line 29, please delete "activated carbon according" and replace it with --activated carbon char according--.

In column 20 line 30, please delete "activated carbon removal" and replace it with --activated carbon char removal--.

In column 20 line 31, please delete "activated carbon from" and replace it with --activated carbon char from--.

In column 20 line 34, please delete "activated carbon comprising" and replace it with --activated carbon char comprising--.

In column 20 line 39, please delete "activated carbon particles" and replace it with --activated carbon char particles--.

UNITED STATES PATENT AND TRADEMARK OFFICE
CERTIFICATE OF CORRECTION

PATENT NO. : 6,960,234 B2
APPLICATION NO. : 10/005279
DATED : November 1, 2005
INVENTOR(S) : Scott E. Hassett it is certified that error appears in the above-identified patent and that said Letters Patent is hereby corrected as shown below:

In column 20 line 43, please delete "activated carbon." and replace it with --activated carbon char.--

Signed and Sealed this

Second Day of January, 2007

JON W. DUDAS
*Director of the United States Patent and Trademark Office*